United States Patent
Warner et al.

(10) Patent No.: US 8,024,388 B2
(45) Date of Patent: Sep. 20, 2011

(54) DVI LINK WITH PARALLEL TEST DATA

(75) Inventors: David J. Warner, Addlestone (GB); Ken S. Hunt, Berkshire (GB); Andrew M. Lever, Old Woking (GB)

(73) Assignee: Micron Technology, Inc., Boise, ID (US)

( * ) Notice: Subject to any disclaimer, the term of this patent is extended or adjusted under 35 U.S.C. 154(b) by 526 days.

(21) Appl. No.: 12/246,310

(22) Filed: Oct. 6, 2008

(65) Prior Publication Data

US 2009/0043834 A1 Feb. 12, 2009

Related U.S. Application Data

(60) Division of application No. 11/330,791, filed on Jan. 12, 2006, now Pat. No. 7,441,172, which is a continuation of application No. 10/163,284, filed on Jun. 4, 2002, now Pat. No. 7,024,607.

(30) Foreign Application Priority Data

Dec. 17, 2001 (GB) .................................. 0130202.5

(51) Int. Cl.
*G06F 1/02* (2006.01)

(52) U.S. Cl. ....................................................... 708/253

(58) Field of Classification Search ........... 708/250–256
See application file for complete search history.

(56) References Cited

U.S. PATENT DOCUMENTS

| 3,956,601 | A | | 5/1976 | Harris et al. |
| 4,701,916 | A | | 10/1987 | Naven et al. |
| 5,257,282 | A | * | 10/1993 | Adkisson et al. ............. 708/253 |
| 5,274,445 | A | | 12/1993 | Overton et al. |
| 5,408,055 | A | | 4/1995 | Harris et al. |
| 5,457,700 | A | | 10/1995 | Merchant |
| 5,553,059 | A | | 9/1996 | Emerson et al. |
| 5,638,309 | A | * | 6/1997 | Negi ............................. 708/250 |

(Continued)

FOREIGN PATENT DOCUMENTS

EP 0196152 10/1986

(Continued)

OTHER PUBLICATIONS

"Digital Visual Interface, Revision 1.0", *Digital Display Working Group*, (1999), pp. 1-76.

(Continued)

*Primary Examiner* — Tan V Mai
(74) *Attorney, Agent, or Firm* — Schwegman, Lundberg & Woessner, P.A.

(57) ABSTRACT

An embodiment includes encoding parallel digital data into encoded and parallel digital data in an encoder and generating parallel test data in a pseudo-random binary sequence generator circuit. The encoded and parallel digital data is coupled through a multiplexer to be serialized in a serializer in a normal mode of operation and the parallel test data is coupled through the multiplexer to be serialized in the serializer in a test mode of operation. Encoded and serial digital data are transmitted to a transmission medium in the normal mode, and serial test data are transmitted to the transmission medium in the test mode. The encoder, the serializer, the sequence generator circuit, and the multiplexer may be fabricated in a single integrated circuit chip. The parallel test data may be parallel pseudo-random binary sequence data. The parallel digital data may include data to generate colors in a visual image.

6 Claims, 6 Drawing Sheets

U.S. PATENT DOCUMENTS

| | | | |
|---|---|---|---|
| 5,715,073 | A | 2/1998 | Miller |
| 5,761,216 | A | 6/1998 | Sotome et al. |
| 6,069,876 | A | 5/2000 | Lander et al. |
| 6,108,801 | A | 8/2000 | Malhotra et al. |
| 6,144,244 | A | 11/2000 | Gilbert |
| 6,188,714 | B1 * | 2/2001 | Yamaguchi .................. 708/252 |
| 6,408,412 | B1 | 6/2002 | Rajsuman |
| 6,950,974 | B1 | 9/2005 | Wohl et al. |
| 7,024,601 | B2 | 4/2006 | Quinlan et al. |
| 7,024,607 | B2 | 4/2006 | Warner et al. |
| 7,441,172 | B2 | 10/2008 | Warner et al. |
| 2003/0070126 | A1 | 4/2003 | Werner et al. |
| 2006/0156161 | A1 | 7/2006 | Warner et al. |
| 2006/0161829 | A1 | 7/2006 | Kobayashi |
| 2007/0208978 | A1 | 9/2007 | Quinlan et al. |

FOREIGN PATENT DOCUMENTS

| | | |
|---|---|---|
| WO | WO-WO01/73465 A2 | 10/2001 |

OTHER PUBLICATIONS

"DVI Test and Measurement Guide, Revision 1.0", *DDWG Electrical Test Working Group*, (2001), pp. 1-26.

* cited by examiner

DVI LINK WITH PARALLEL TEST DATA

CLAIM OF PRIORITY

This application is a divisional of U.S. application Ser. No. 11/330,791 filed Jan. 12, 2006 now U.S. Pat. No. 7,441,172, which is a continuation of U.S. application Ser. No. 10/163,284 filed Jun. 4, 2002, now issued as U.S. Pat. No. 7,024,607, which claims priority under 35 U.S.C. 119 from British Application No. 0130202.5 filed Dec. 17, 2001, which applications are incorporated herein by reference.

FIELD OF THE INVENTION

The present invention relates generally to digital visual interface links, and more particularly, to a digital visual interface link with a circuit and method for testing the link.

BACKGROUND

A digital visual interface (DVI) link is a high-speed digital connection to transmit digital visual information including data and/or instructions. The DVI link is used primarily to transmit digital visual information between a computing device and a display unit such as a monitor that displays the digital visual information. An advantage of the DVI link over analog links is that the digital visual information in the DVI link remains in the digital domain to substantially prevent losses of the information. The DVI link is useful in a wide range of computing and display units, and more than one DVI link may be used to increase bandwidth. Typically, the DVI link is implemented with two physical connectors, one that is only digital and the other having both analog and digital components. The computing device and the display unit each have a connector, and a transmission medium such as a cable is connected between the connectors to carry the digital visual information. The digital visual information is transmitted serially.

A DVI link is tested in a test mode with a Bit Error Rate Testing (BERT) method, and during the test mode a defined pseudo-random binary sequence (PRBS) pattern of data is generated and transmitted over the DVI link. Data is received from the DVI link and a bit error rate (BER) is determined for the DVI link by comparing the data received with the PRBS pattern. One problem with the BERT method of testing the DVI link is that the PRBS pattern is incompatible with encoded digital visual information that is transmitted over the DVI link during its normal operation. The incompatibility makes the test mode of the DVI link difficult and cumbersome.

There remains a need for a method of testing a DVI link, or a circuit for testing the DVI link, which is efficient and convenient and substantially overcomes the incompatibility between a PRBS pattern used to test the DVI link and digital visual information that is transmitted over the DVI link during its normal operation.

SUMMARY OF THE INVENTION

The above mentioned and other needs are addressed in the following detailed description. According to one embodiment of the present invention a method includes encoding parallel digital data into encoded and parallel digital data in a transition minimized differential signaling encoder and generating parallel test data in a pseudo-random binary sequence generator circuit. The encoded and parallel digital data is coupled through a multiplexer to be serialized in a serializer in a normal mode of operation and the parallel test data is coupled through the multiplexer to be serialized in the serializer in a test mode of operation. The test mode of operation may be selected by a test signal coupled to the multiplexer. Encoded and serial digital data are transmitted from the serializer to a transmission medium in the normal mode of operation, and serial test data are transmitted from the serializer to the transmission medium in the test mode of operation. The encoder, the serializer, the sequence generator circuit, and the multiplexer may be fabricated in a single integrated circuit chip. The parallel test data may be parallel pseudo-random binary sequence data that repeats every $2^{23}-1$ clock cycles when in serial form, and may be generated by twenty three clocked D-type flip flops coupled together. The parallel digital data may include data to generate colors in a visual image, and the encoded and serial digital data may be received, deserialized, decoded, and displayed in a display unit. The transmission medium may be copper cables, optical fibers, or fiber optic cables. The encoded and serial digital data or the serial test data may be transmitted as a differential signal over the transmission medium.

Advantages of the present invention will be apparent to one skilled in the art upon an examination of the detailed description.

DETAILED DESCRIPTION

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims.

In this description, a digital signal of 1 may also be called a high signal and a digital signal of 0 may also be called a low signal. In this description, unless otherwise specified, a line comprises a transmission medium capable of transmitting a signal. For example, the line may comprise a conductive wire such as a copper cable, or an optical fiber.

Figure 1:
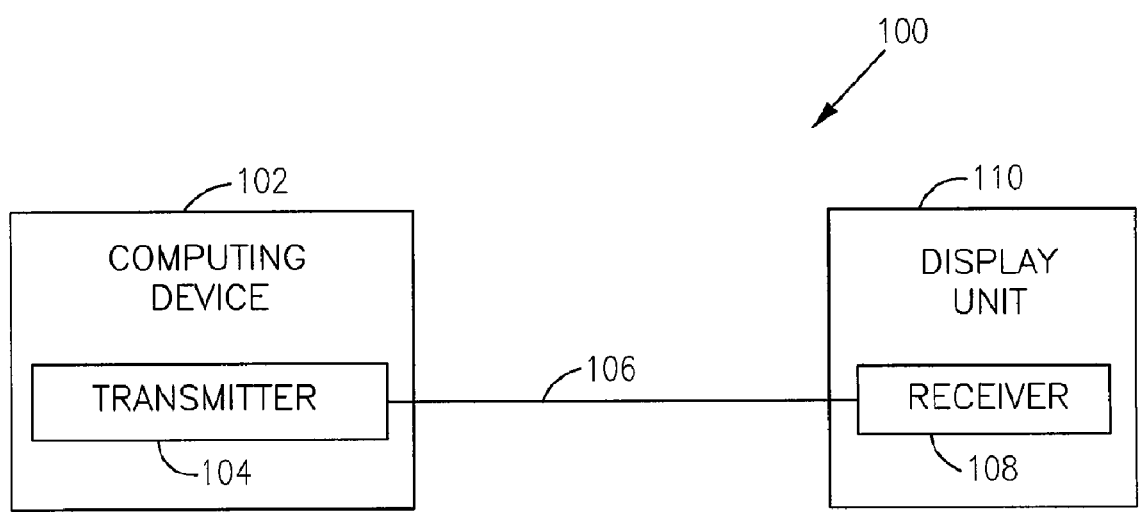
FIG. 1 is a block diagram of an information-handling system according to an embodiment of the present invention.

A block diagram of an information-handling system 100 is shown in FIG. 1 according to an embodiment of the present invention. The system 100 includes a computing device 102 having a digital visual interface (DVI) transmitter 104 circuit to transmit digital visual information including data and/or instructions. The DVI transmitter 104 transmits the digital visual information serially over a transmission medium 106. Digital visual information will also be referred to as digital data in this description for purposes of brevity. A digital visual interface (DVI) receiver 108 circuit in a display unit 110 is coupled to receive the digital visual information from the transmission medium 106. The digital visual information is displayed as a visual image in the display unit 110. The transmission medium 106 may comprise one or more conductive wires such as copper cables, or one or more optical fibers, or one or more fiber optic cables. The DVI transmitter 104, the transmission medium 106, and the DVI receiver 108 comprise a digital visual interface (DVI) link according to an embodiment of the present invention. The DVI link may also be identified more generally as an information transmission link or a communications link.

The computing device 102 may comprise a workstation, a desktop computer, a laptop computer, a network computer (NC), a hand-held computer, a personal computer, or a multiprocessor supercomputer. The display unit 110 may be any device known to those skilled in the art that can display the digital visual information and may comprise a cathode ray tube (CRT), a flat panel display such as a liquid crystal display (LCD), or a television such as a high definition television (HDTV).

The system 100 including both the computing device 102 and the display unit 110 may comprise a workstation, a desktop computer, a laptop computer, a network computer (NC), a hand-held computer, a personal computer, a multiprocessor supercomputer, a video game, a hand-held calculator, a television set-top box, a fixed-screen telephone, a smart mobile phone, or a personal digital assistant (PDA), an information appliance such as, for example, a cellular telephone or any wireless device, a pager, a daily planner or organizer, an information component such as, for example, a magnetic disk drive or telecommunications modem, or other appliance such as, for example, a washing machine or a microwave oven having an electronic controller.

Figure 2:
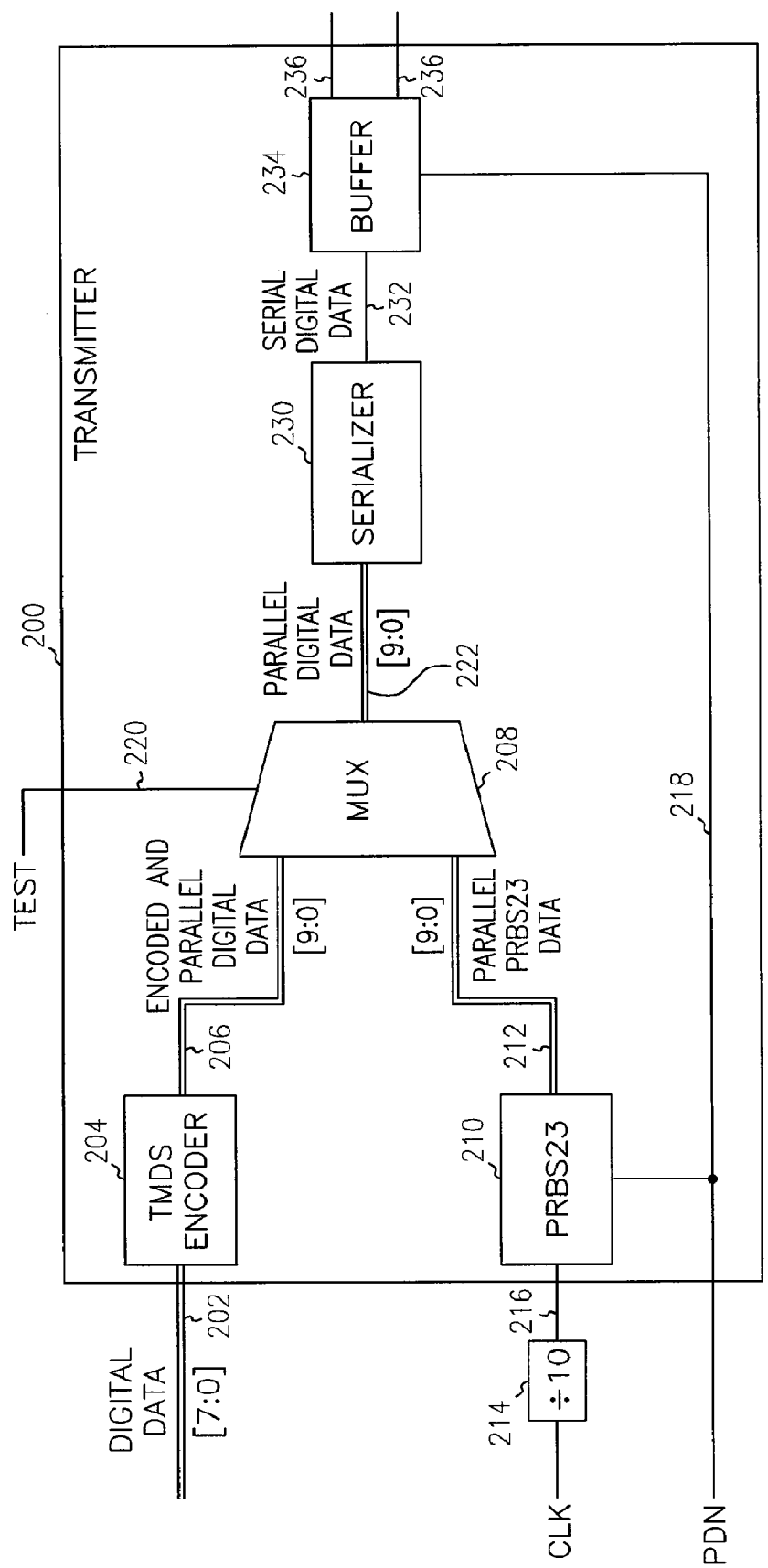
FIG. 2 is a block diagram of a digital visual interface transmitter circuit according to an embodiment of the present invention.

A block diagram of a digital visual interface (DVI) transmitter 200 circuit is shown in FIG. 2 according to an embodiment of the present invention. The DVI transmitter 200 may comprise the DVI transmitter 104 shown in FIG. 1. The DVI transmitter 200 is coupled to receive digital data from a plurality of parallel lines [7:0] 202 that are coupled to a transition minimized differential signaling (TMDS) encoder 204. The TMDS encoder 204 is a type of encoder known to those skilled in the art. The digital data comprise 8 digital signals transmitted in parallel representing an 8 bit code, and may comprise more or less digital signals according to alternate embodiments of the present invention. The TMDS encoder 204 encodes the digital data into encoded and parallel digital data comprising 10 digital signals that represents a 10 bit code and is suitable for transmission over the transmission medium 106 shown in FIG. 1. The encoded and parallel digital data is transmitted over a set of parallel lines [9:0] 206 coupled between the TMDS encoder 204 and a multiplexer 208. The multiplexer 208 is a type of multiplexer known to those skilled in the art.

Parallel pseudo-random binary sequence (PRBS) data is generated in a pseudo-random binary sequence (PRBS) generator circuit, and in particular a PRBS23 generator 210 circuit. The PRBS23 generator 210 generates parallel PRBS23 data comprising 10 digital signals that represents a 10 bit code and is suitable for transmission over the transmission medium 106 shown in FIG. 1. The parallel PRBS23 data is transmitted over a set of parallel lines [9:0] 212 coupled between the PRBS23 generator 210 and the multiplexer 208. A clock signal CLK is received and divided by a divide-by-ten circuit 214 into a divided clock signal that is coupled to the PRBS23 generator 210 on a line 216. The divide-by-ten circuit 214 is a type of circuit known to those skilled in the art. A power-down (PDN) signal is coupled to the PRBS23 generator 210 on a line 218 to initialize the PRBS23 generator 210.

A test signal (TEST) is coupled to the multiplexer 208 through a line 220 to change the state of the multiplexer 208 to start or end a test mode of operation. The multiplexer 208 transmits parallel digital data comprising 10 digital signals that represents a 10 bit code and is suitable for transmission over the transmission medium 106 shown in FIG. 1. The parallel digital data from the multiplexer 208 is transmitted over a set of parallel lines [9:0] 222 coupled between the multiplexer 208 and a serializer 230. The serializer 230 is a type of serializer known to those skilled in the art. The serializer 230 receives and serializes the parallel digital data into serial digital data to be transmitted on a line 232 coupled between the serializer 230 and a buffer 234 circuit. The buffer 234 is a type of buffer known to those skilled in the art. The buffer 234 converts the serial digital data into a differential signal that is transmitted over a pair of differential lines 236 coupled to the buffer 234. The buffer 234 is also coupled to receive the PDN signal from the line 218. The differential lines 236 may comprise the transmission medium 106 and may be coupled to the DVI receiver 108 in the display unit 110 shown in FIG. 1. In one embodiment of the present invention, the DVI transmitter 200 including all of its elements is in a single integrated circuit chip, and is fabricated as a single integrated circuit chip that may or may not include other circuits.

The DVI transmitter 200 operates in the following manner. During a normal, non-test mode of operation, the encoded and parallel digital data from the TMDS encoder 204 is passed through the multiplexer 208 to the serializer 230 to be serialized. The encoded and serial digital data is then converted into a differential signal by the buffer 234 to be transmitted over the differential lines 236. The DVI link is tested in a test mode of operation during which the multiplexer 208 is switched by the TEST signal on the line 220. During the test mode, parallel PRBS23 data is generated in the PRBS23 generator 210 and the multiplexer 208 is configured by the TEST signal to transmit the parallel PRBS23 data on the lines 222 to the serializer 230 to be serialized. The serial PRBS23 data is then converted into a differential signal by the buffer 234 to be transmitted over the differential lines 236 to test the DVI link in the information-handling system 100.

An advantage of the DVI transmitter 200 is that the parallel PRBS23 data is not passed through the TMDS encoder 204 and the test of the DVI link is not complicated by such a transformation of the PRBS23 data. The parallel PRBS23 data is generated in the PRBS23 generator 210 separate from the circuits that modify the digital data from the lines 202.

Figure 3:
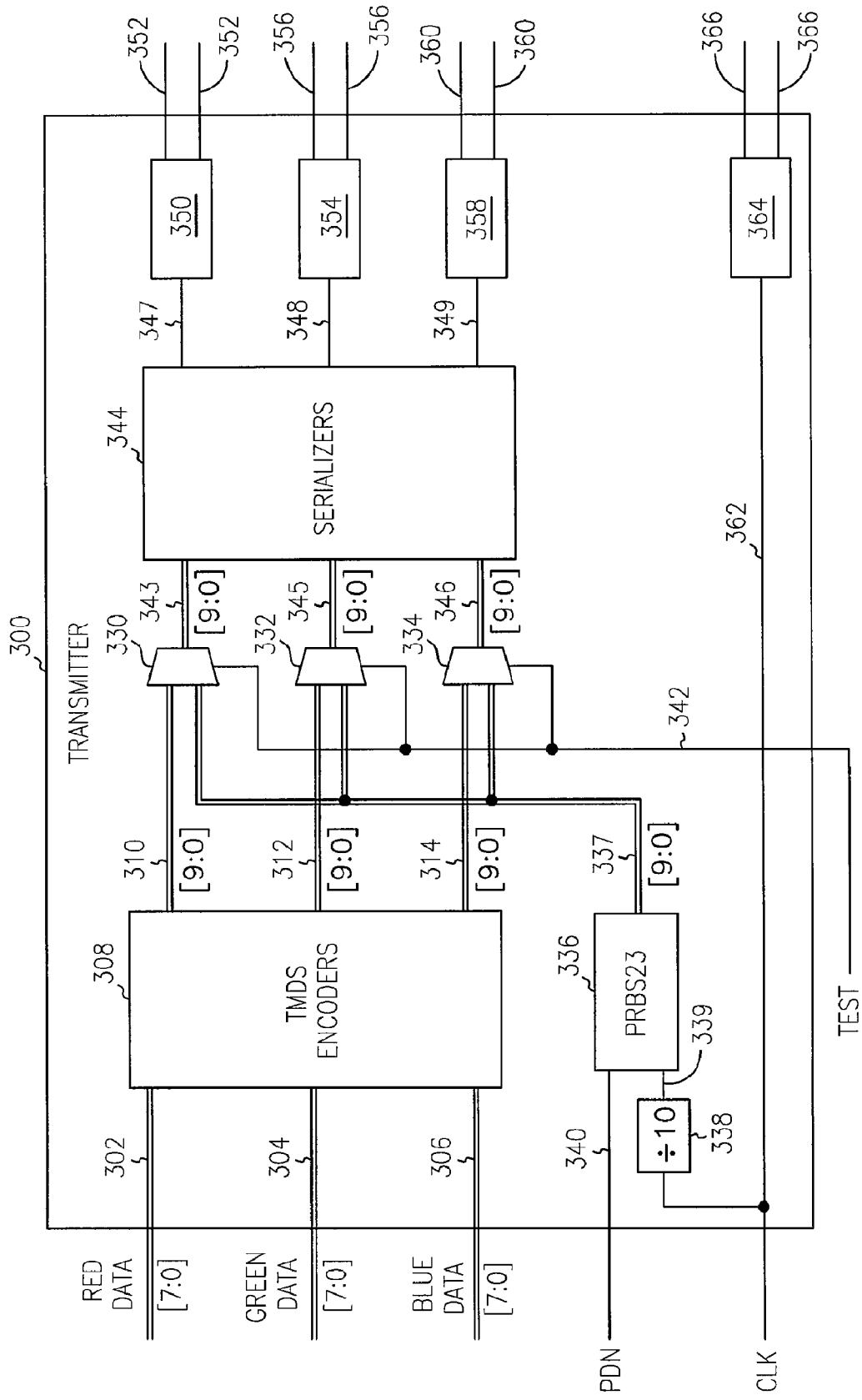
FIG. 3 is a block diagram of a digital visual interface transmitter circuit according to an embodiment of the present invention.

A block diagram of a digital visual interface (DVI) transmitter 300 circuit is shown in FIG. 3 according to an embodiment of the present invention. The DVI transmitter 300 may comprise the DVI transmitter 104 shown in FIG. 1. The DVI transmitter 300 is coupled to receive parallel and digital red data, green data, and blue data representing digital visual information. The red data is to be coupled to a display unit to generate red color in a visual image, the green data is to be coupled to the display unit to generate green color in the visual image, and the blue data is to be coupled to the display unit to generate blue color in the visual image. The visual image is displayed by the display unit. Each of the red data, the green data, and the blue data comprise 8 digital signals representing an 8 bit code transmitted in parallel and may comprise more or less digital signals according to alternate embodiments of the present invention. The red data is received from a plurality of parallel lines [7:0] 302, the green data is received from a plurality of parallel lines [7:0] 304, and the blue data is received from a plurality of parallel lines [7:0] 306. The lines 302, 304, and 306 are coupled to a plurality of transition minimized differential signaling (TMDS) encoders 308. The TMDS encoders 308 are comprised of a type of encoder known to those skilled in the art. The TMDS encoders 308 encode the red data, the green data, and the blue data into encoded red data, encoded green data, and encoded blue data that is parallel and digital and suitable for transmission over the transmission medium 106 shown in FIG. 1.

The encoded red data, the encoded green data, and the encoded blue data each comprise 10 digital signals representing a 10 bit code, and each are transmitted over three respective sets of parallel lines [9:0] 310, 312, and 314. The lines 310 are coupled to transmit the encoded red data between the TMDS encoders 308 and a first multiplexer 330. The lines 312 are coupled to transmit the encoded green data between the TMDS encoders 308 and a second multiplexer 332. The lines 314 are coupled to transmit the encoded blue data between the TMDS encoders 308 and a third multiplexer 334. Each of the multiplexers 330, 332, and 334 is a type of multiplexer known to those skilled in the art.

Parallel pseudo-random binary sequence (PRBS) data is generated in a pseudo-random binary sequence (PRBS) generator circuit, and in particular a PRBS23 generator 336 circuit. The PRBS23 generator 336 generates parallel PRBS23 data comprising 10 digital signals that represents a 10 bit code and is suitable for transmission over the transmission medium 106 shown in FIG. 1. The parallel PRBS23 data is transmitted over a set of parallel lines [9:0] 337 coupled between the PRBS23 generator 336 and the first multiplexer 330, the second multiplexer 332, and the third multiplexer 334. A clock signal CLK is received and divided by a divide-by-ten circuit 338 into a divided clock signal that is coupled to the PRBS23 generator 336 on a line 339. The divide-by-ten circuit 338 is a type of circuit known to those skilled in the art. A power-down (PDN) signal is coupled to the PRBS23 generator 336 on a line 340 to initialize the PRBS23 generator 336.

A test signal (TEST) is coupled to each of the multiplexers 330, 332, and 334 over a line 342 to change the state of the multiplexers 330, 332, and 334 during a test mode of operation as will be explained hereinbelow.

Each of the multiplexers 330, 332, and 334 transmits parallel digital data comprising 10 digital signals that represents a 10 bit code and is suitable for transmission over the transmission medium 106 shown in FIG. 1. The parallel digital data from the first multiplexer 330 is transmitted over a set of parallel lines [9:0] 343 coupled between the first multiplexer 330 and a plurality of serializers 344. The parallel digital data from the second multiplexer 332 is transmitted over a set of parallel lines [9:0] 345 coupled between the second multiplexer 332 and the serializers 344. The parallel digital data from the third multiplexer 334 is transmitted over a set of parallel lines [9:0] 346 coupled between the third multiplexer 334 and the serializers 344. The serializers 344 are each comprised of a type of serializer known to those skilled in the art.

The serializers 344 receive and serialize the parallel digital data to be transmitted in serial form over three respective lines 347, 348, and 349. The line 347 is coupled to transmit first serial data between the serializers 344 and a first buffer 350 circuit. The first buffer 350 converts the first serial data into a first differential signal that is transmitted over a first pair of differential lines 352 coupled to the first buffer 350. The line 348 is coupled to transmit second serial data between the serializers 344 and a second buffer 354 circuit. The second buffer 354 converts the second serial data into a second differential signal that is transmitted over a second pair of differential lines 356 coupled to the second buffer 354. The line 349 is coupled to transmit third serial data between the serializers 344 and a third buffer 358 circuit. The third buffer 358 converts the third serial data into a third differential signal that is transmitted over a third pair of differential lines 360 coupled to the third buffer 358. The first, second, and third differential lines 352, 356, and 360 may comprise the transmission medium 106 and may be coupled to the DVI receiver 108 in the display unit 110 shown in FIG. 1.

The clock signal CLK is coupled to a line 362 in the DVI transmitter 300 that is coupled through to a fourth buffer 364 circuit. The fourth buffer 364 converts the CLK signal into a differential clock signal that is transmitted over a fourth pair of differential lines 366 coupled to the fourth buffer 364. In one embodiment of the present invention, the DVI transmitter 300 including all of its elements is in a single integrated circuit chip, and is fabricated as a single integrated circuit chip that may or may not include other circuits.

The DVI transmitter 300 operates in the following manner. During a normal, non-test mode of operation the encoded red data, the encoded green data, and the encoded blue data is transmitted from the lines 310, 312, and 314 through the respective multiplexers 330, 332, and 334 in parallel form to the serializers 344. The serializers 344 receive and serialize the encoded red data, the encoded green data, and the encoded blue data, and transmit this data in serial form over the lines 347, 348, and 349 to the respective buffers 350, 354, and 358. The buffers 350, 354, and 358 convert this serial data into differential signals that are transmitted over the differential lines 352, 356, and 360. The DVI link is tested in a test mode of operation during which the multiplexers 330, 332, and 334 are switched by the TEST signal on the line 342. During the test mode, PRBS23 data is generated in the PRBS23 generator 336 and the multiplexers 330, 332, and 334 are reconfigured by the TEST signal to transmit the PRBS23 data in parallel form from the lines 337 to the serializers 344 through the lines 343, 345, and 346. The serializers 344 receive and serialize the PRBS23 data, and transmit this data in serial form over the lines 347, 348, and 349 to the respective buffers 350, 354, and 358. The buffers 350, 354, and 358 convert this serial data into differential signals that are transmitted over the differential lines 352, 356, and 360 to test the DVI link in the information-handling system 100.

Figure 4:
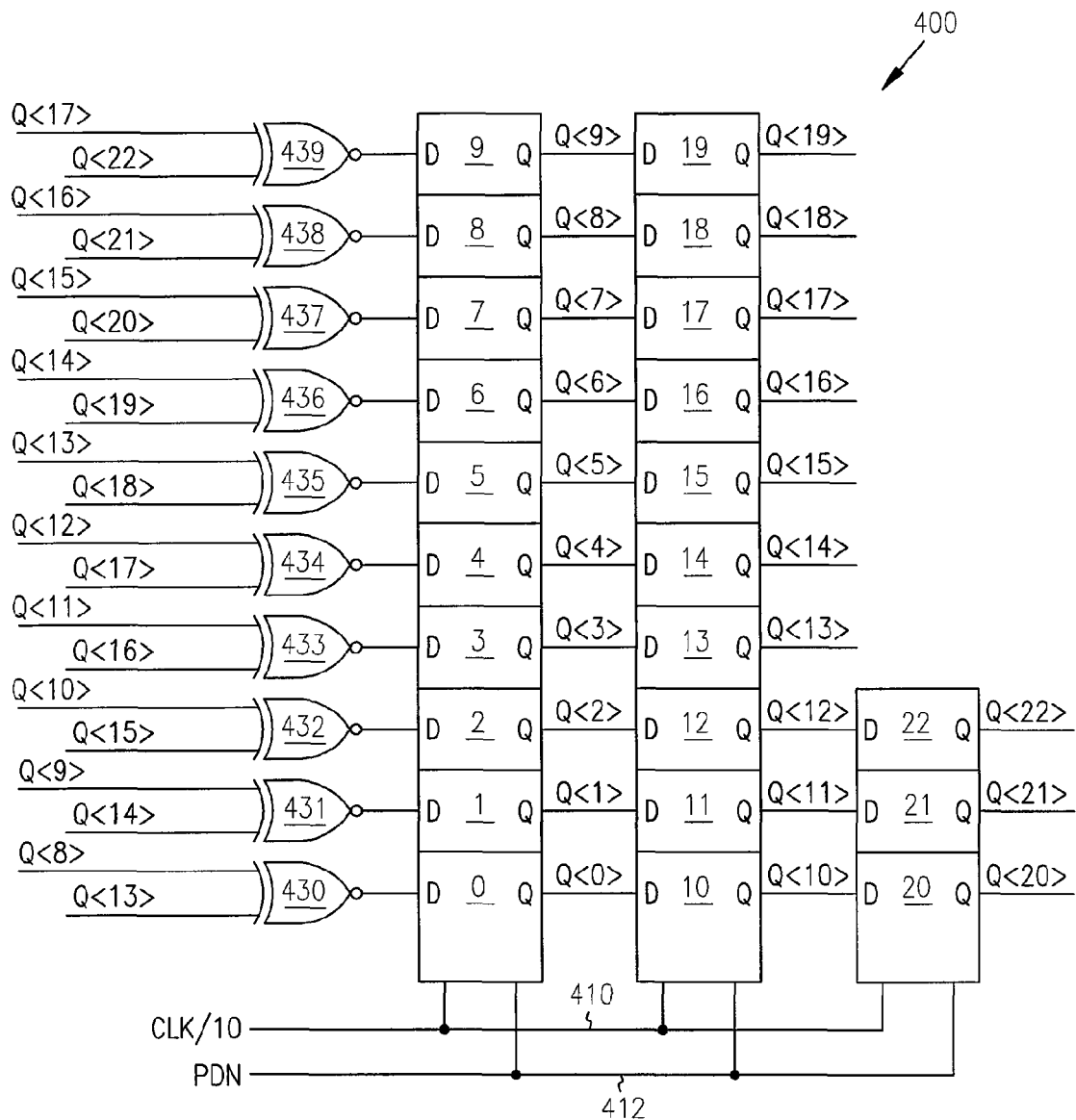
FIG. 4 is a block diagram of a pseudo-random binary sequence data generator circuit according to an embodiment of the present invention.

A block diagram of a pseudo-random binary sequence (PRBS) generator circuit, and in particular a PRBS23 generator 400 circuit, is shown in FIG. 4 according to an embodiment of the present invention. The PRBS23 generator 400 may comprise the PRBS23 generator 210 shown in FIG. 2, or the PRBS23 generator 336 shown in FIG. 3. The PRBS23 generator 400 generates pseudo-random binary sequence (PRBS) data, and specifically PRBS23 data that repeats every $2^{23}-1$ clock cycles. The PRBS23 generator 400 comprises a structure of twenty three clocked D-type flip flops 0-22 coupled together, each of the D-type flip flops 0-22 being standard and known to those skilled in the art. Each of the D-type flip flops 0-22 has a D input and a Q output. Each Q output is identified by the number of its D-type flip flop in brackets. For example, the D-type flip flop 18 has a Q output Q<18>. Each of the D-type flip flops 0-22 also has inputs coupled to receive the divided clock (CLK/10) signal on a line 410 and the power-down (PDN) signal on a line 412. The CLK/10 signal and the PDN signal were both shown and described with reference to FIGS. 2 and 3. Each of the D-type flip flops 0-22 is triggered to change state by a transition in the CLK/10 signal, and each is initialized or cleared by the PDN signal.

The D-type flip flops 0-22 are coupled together with ten exclusive-NOR gates 430-439. Each of the exclusive-NOR gates 430-439 has a first input, a second input, and an output. The ten Q outputs Q<0> to Q<9> are coupled in parallel to the respective D inputs of the D-type flip flops 10-19. The three Q outputs Q<10> to Q<12> are coupled in parallel to the respective D inputs of the D-type flip flops 20-22. The outputs of the exclusive-NOR gates 430-439 are coupled in parallel to the respective D inputs of the D-type flip flops 0-9. The first inputs of the exclusive-NOR gates 430-439 are coupled in parallel to the respective the ten Q outputs Q<8> to Q<17>. The second inputs of the exclusive-NOR gates 430-439 are coupled in parallel to the respective ten Q outputs Q<13> to Q<22>.

The PRBS23 generator 400 generates the PRBS23 data in parallel on the ten Q outputs Q<0> to Q<9>. The PRBS23 data is generated at each transition in the CLK/10 signal on the line 410. The ten Q outputs Q<0> to Q<9> may be coupled to the lines 212 shown in FIG. 2, or the lines 337 shown in FIG. 3 to transmit the PRBS23 data. The PRBS generator 400 generates the PRBS23 data in parallel clocked at a reduced rate by the CLK/10 signal such that the PRBS23 data can be transmitted to the serializers 344 at the same rate as the encoded red data, the encoded green data, and the encoded blue data through the lines 310, 312, and 314. The PRBS23 generator 400 is fabricated in the DVI transmitter 200 shown in FIG. 2 in a single integrated circuit chip, or in the DVI transmitter 300 shown in FIG. 3 in a single integrated circuit chip, according to alternate embodiments of the present invention.

Figure 5:
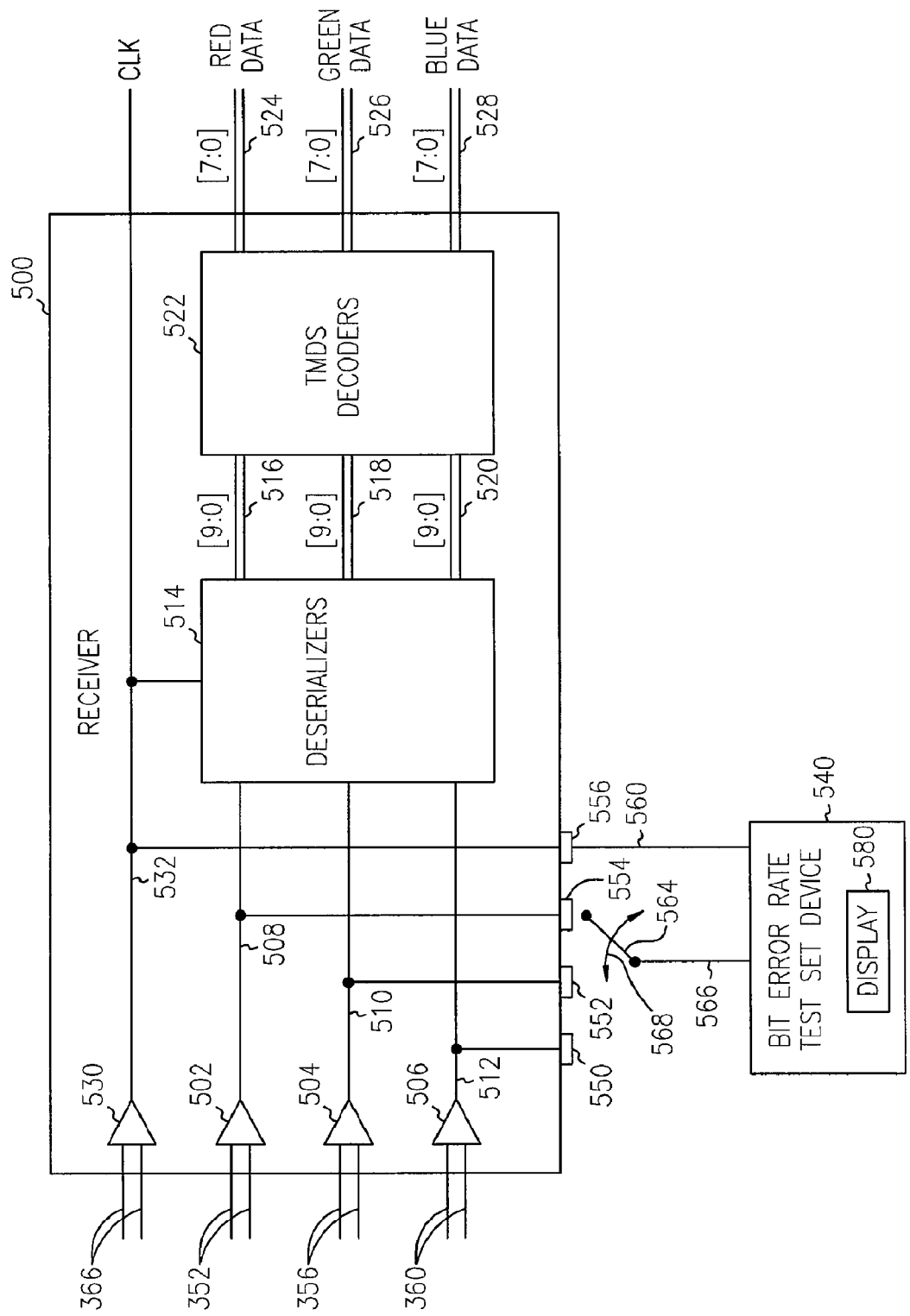
FIG. 5 is a block diagram of a digital visual interface receiver circuit according to an embodiment of the present invention.

A block diagram of a digital visual interface (DVI) receiver 500 circuit is shown in FIG. 5 according to an embodiment of the present invention. The DVI receiver 500 may comprise the DVI receiver 108 shown in FIG. 1. The DVI receiver 500 is coupled to receive the encoded and serial red data, the encoded and serial green data, and the encoded and serial blue data as differential signals from the differential lines 352, 356, and 360. Each differential signal is coupled to one of three differential line receivers 502, 504, and 506 in the DVI receiver 500 to convert the differential signal into a single-ended signal on one of three respective lines 508, 510, and 512. The encoded and serial red data, the encoded and serial green data, and the encoded and serial blue data are then coupled as single-ended signals to a plurality of deserializers 514 through the lines 508, 510, and 512 to be deserialized. The deserializers 514 generate encoded red data, encoded green data, and encoded blue data, each comprising 10 digital signals representing a 10 bit code transmitted in parallel over one of three respective sets of parallel lines [9:0] 516, 518, and 520. There may be more or less parallel lines according to alternate embodiments of the present invention. The lines 516, 518, and 520 are coupled between the deserializers 514 and a plurality of transition minimized differential signaling (TMDS) decoders 522. The deserializers 514 are comprised of a type of deserializer known to those skilled in the art, and the TMDS decoders 522 are comprised of a type of decoder known to those skilled in the art. The TMDS decoders 522 decode the encoded red data, the encoded green data, and the encoded blue data into red data, green data, and blue data suitable for use to generate a visual image in the display unit 110 shown in FIG. 1. The red data, green data, and blue data each comprise 8 digital signals representing an 8 bit code transmitted in parallel over one of three respective sets of parallel lines [7:0] 524, 526, and 528 to the display unit 110. The differential clock signal on the differential lines 366 is coupled to a differential line receiver 530 in the DVI receiver 500 that converts the differential clock signal back into the clock signal CLK on a line 532. The line 532 couples the clock signal CLK to the deserializers 514. The differential line receivers 502, 504, 506, and 530 are each comprised of a type of differential line receiver known to those skilled in the art.

The DVI link is tested in the test mode of operation described above during which PRBS23 data is generated and transmitted over the differential lines 352, 356, and 360 to the DVI receiver 500. The DVI link is tested by analyzing the data received by the DVI receiver 500 in a bit error rate test set device 540. The test set device 540 is coupled to receive serial data from one of the lines 508, 510, and 512 through one of three respective external terminals 550, 552, and 554 on the DVI receiver 500. The line 532 is coupled to a fourth external terminal 556 to supply the clock signal CLK.

The test set device 540 is coupled to the fourth external terminal 556 through a line 560 to receive the clock signal CLK from the DVI receiver 500, and is coupled through a 3-way mechanical switch 564 to one of the external terminals 550, 552, and 554. The switch 564 may be moved manually by a user in a reversible direction 568 to be coupled to one of the external terminals 550, 552, and 554. The test set device 540 may also be coupled to one of the external terminals 550, 552, and 554 by a flying lead according to an alternate embodiment of the present invention.

The DVI link is tested in the following manner. The PRBS23 data is generated and transmitted as differential signals over the differential lines 352, 356, and 360 to the DVI receiver 500. The differential signals are each coupled to one of the differential line receivers 502, 504, and 506 to convert the differential signals into single-ended signals on the respective lines 508, 510, and 512. One of the single-ended signals is coupled to the test set device 540 through the switch 564, and the test set device 540 analyzes the single-ended signal along with the clock signal CLK from the DVI receiver 500 to determine if there was any corruption of the data transmitted over the differential lines 352, 356, and 360. The position of the switch 564 indicates the differential lines 352, 356, and 360 being tested. Results of the test are displayed on a display 580 in the test set device 540.

The differential lines 352, 356, 360, and 366 shown in FIGS. 3 and 5 may comprise the transmission medium 106 shown in FIG. 1. Each of the pairs of differential lines 352, 356, 360, and 366 may be referred to as a channel.

The embodiments of the present invention shown in FIGS. 1-5 and described above are capable of testing a digital visual interface (DVI) link in an efficient and convenient manner. The embodiments of the present invention shown in FIGS. 1-5 and described above include encoders coupled to one or more multiplexers in parallel with a pseudo-random binary sequence (PRBS) generator circuit. The encoders may encode digital visual information that is transmitted over the DVI link during a normal operation of the DVI link. The PRBS generator circuit may generate pseudo-random binary sequence (PRBS) data that is transmitted over the DVI link during a test mode of operation to test the DVI link. Multiplexers select either the digital visual information or the PRBS data. The digital visual information and the PRBS data are serialized by serializers before being transmitted. The PRBS generator circuit generates the PRBS data in parallel clocked at a reduced rate such that the PRBS data can be transmitted to the serializers at the same rate as the digital visual information. The encoders do not interfere with the PRBS data transmitted to test the DVI link. The encoders, the serializers, the multiplexers, and the PRBS generator circuit may be fabricated in the same integrated circuit chip according to embodiments of the present invention.

Figure 6:
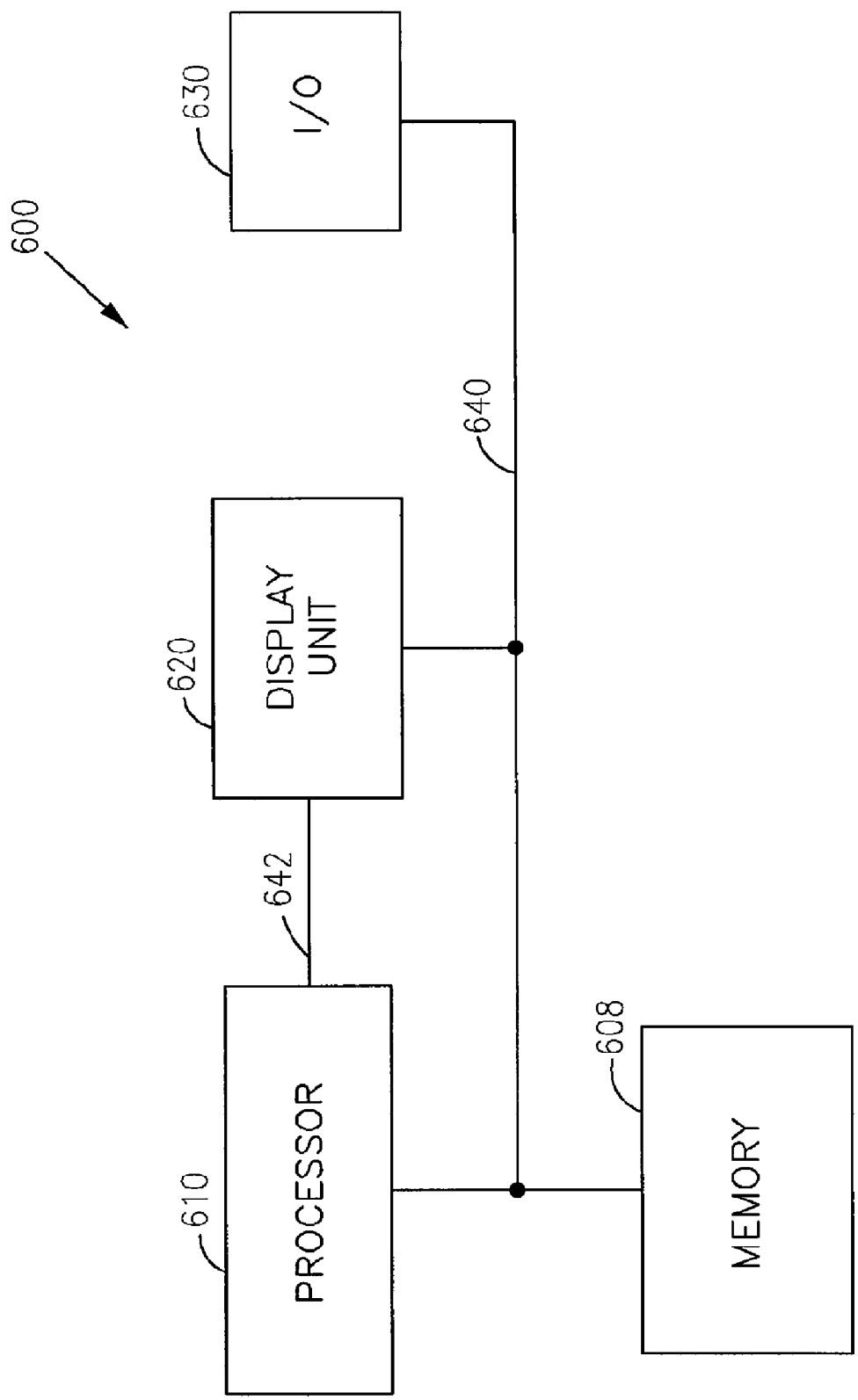
FIG. 6 is a block diagram of an information-handling system according to an embodiment of the present invention.

A block diagram of an information-handling system 600 is shown in FIG. 6 according to an embodiment of the present invention. The information-handling system 600 includes a memory system 608, a processor 610, a display unit 620, and an input/output (I/O) subsystem 630. The processor 610 may be, for example, a microprocessor. The processor 610, the display unit 620, the I/O subsystem 630, and the memory system 608 are coupled together by a suitable communication line or bus 640. The processor 610, the display unit 620, the I/O subsystem 630, and the memory system 608 transmit and/or receive information to and from each other over the bus 640. The information includes data and/or instructions transmitted as signals, or digital signals, over the bus 640. The I/O subsystem 630 may be a keyboard or other device to allow a user to communicate with the system 600. A digital visual interface (DVI) link including one or more of the embodiments of the present invention shown in FIGS. 1-5 and described above may be included in two or more of the processor 610, the display unit 620, the I/O subsystem 630, and the memory system 608, and may be part of the bus 640. In an alternative embodiment of the present invention, a digital visual interface (DVI) link including one or more of the embodiments of the present invention shown in FIGS. 1-5 and described above may be included in the processor 610 and the display unit 620, and may include a separate transmission medium 642 coupled between the processor 610 and the display unit 620.

In various embodiments of the present invention, the display unit 620 is a cathode ray tube (CRT) display, or a flat panel display such as a liquid crystal display (LCD), or a high definition television (HDTV). The display unit 620 may display a visual image generated from digital visual information transmitted over the digital visual interface (DVI) link including one or more of the embodiments of the present invention shown in FIGS. 1-5 and described above.

In various embodiments of the present invention, the information-handling system 600 is a computer system (such as, for example, a video game, a hand-held calculator, a television set-top box, a fixed-screen telephone, a smart mobile phone, a personal digital assistant (PDA), a network computer (NC), a hand-held computer, a workstation, a personal computer, a desktop computer, a laptop computer, or a multiprocessor supercomputer), an information appliance (such as, for example, a cellular telephone, a pager, a daily planner or organizer, or any wireless device), an information component (such as, for example, a magnetic disk drive or telecommunications modem), or other appliance (such as, for example, a hearing aid, washing machine or microwave oven having an electronic controller).

Although specific embodiments have been illustrated and described herein, it will be appreciated by those skilled in the art having the benefit of this description that any equivalent arrangement may be substituted for the specific embodiments shown. The present invention is therefore limited only by the claims and equivalents thereof.

What is claimed is:

1. A parallel pseudo-random binary sequence generator comprising:
    twenty three clocked D-type flip flops each identified by an integer X between 0 and 22, each flip flop comprising a D input D<X> and a Q output Q<X>, and wherein each D-type flip flop has an input coupled to receive a divided clock signal and an input coupled to receive initialization and reset signals; and
    ten exclusive-NOR gates N<Y>each identified by an integer Y between 0 and 9, each exclusive-NOR gate comprising a first input, a second input, and an output, wherein:
        the ten Q outputs Q<0> to Q<9> are coupled in parallel to the respective ten D inputs D<10> to D<19>;
        the three Q outputs Q<10> to Q<12> are coupled in parallel to the respective three D inputs D<20> to D<22>;
        the ten D inputs D<0> to D<9> are coupled in parallel to the respective outputs of the exclusive-NOR gates N<0> to N<9>;
        the first inputs of the exclusive-NOR gates N<0> to N<9> being coupled in parallel to the respective ten Q outputs Q<8> to Q<17>;
        the second inputs of the exclusive-NOR gates N<0> to N<9> being coupled in parallel to the respective ten Q outputs Q<13> to Q<22>; and
        the ten Q outputs Q<0> to Q<9> comprise parallel lines on which test data comprising the parallel pseudo-random binary sequence data is generated.

2. The parallel pseudo-random binary sequence generator of claim 1, wherein the test data signals transmitted comprise the ten Q outputs Q<0> to Q<9>.

3. The parallel pseudo-random binary sequence generator of claim 1, wherein the test data signals transmitted comprise a combination of two or more of the ten Q outputs Q<0> to Q<9>.

4. The parallel pseudo-random binary sequence generator of claim 1, wherein the clock signal input is a divide by ten clock signal input.

5. The parallel pseudo-random binary sequence generator of claim 1, wherein the ten Q outputs Q<0> to Q<9> are coupled to at least one multiplexer.

6. The parallel pseudo-random binary sequence generator of claim 5, wherein the multiplexer is coupled to receive encoded digital visual signals.

* * * * *

UNITED STATES PATENT AND TRADEMARK OFFICE
CERTIFICATE OF CORRECTION

| | | |
|---|---|---|
| PATENT NO. | : 8,024,388 B2 | Page 1 of 1 |
| APPLICATION NO. | : 12/246310 | |
| DATED | : September 20, 2011 | |
| INVENTOR(S) | : David J. Warner et al. | |

It is certified that error appears in the above-identified patent and that said Letters Patent is hereby corrected as shown below:

In column 1, line 6, delete "2006" and insert -- 2006, --, therefor.

In column 10, line 19, in Claim 1, delete "N<Y>each" and insert -- N<Y> each --, therefor.

In column 10, line 48, in Claim 4, delete "is a divide" and insert -- is divided --, therefor.

Signed and Sealed this
Twenty-ninth Day of November, 2011

David J. Kappos
*Director of the United States Patent and Trademark Office*